US012757050B2

(12) United States Patent
Feng et al.

(10) Patent No.: US 12,757,050 B2
(45) Date of Patent: Oct. 6, 2026

(54) WLAN SENSING MEASUREMENT REPORT REGARDING RECEIVER SNR

(71) Applicant: MediaTek Inc., Hsinchu City (TW)

(72) Inventors: Shuling Feng, San Jose, CA (US); Tsung-Han Tsai, Hsinchu City (TW); Jianhan Liu, San Jose, CA (US); Thomas Edward Pare, Jr., San Jose, CA (US)

(73) Assignee: MediaTek Inc., Hsinchu City (TW)

( * ) Notice: Subject to any disclaimer, the term of this patent is extended or adjusted under 35 U.S.C. 154(b) by 322 days.

(21) Appl. No.: 18/409,854

(22) Filed: Jan. 11, 2024

(65) Prior Publication Data

US 2024/0244468 A1 Jul. 18, 2024

Related U.S. Application Data

(60) Provisional application No. 63/479,555, filed on Jan. 12, 2023.

(51) Int. Cl.

| | |
|---|---|
| ***H04L 1/00*** | (2006.01) |
| ***H04B 17/309*** | (2015.01) |
| ***H04W 24/10*** | (2009.01) |

(52) U.S. Cl.
CPC .......... *H04W 24/10* (2013.01); *H04B 17/346* (2023.05)

(58) Field of Classification Search
CPC ...... H04W 24/10; H04W 24/08; H04W 48/16
See application file for complete search history.

(56) References Cited

U.S. PATENT DOCUMENTS

| | | | | |
|---|---|---|---|---|
| 2017/0280344 | A1* | 9/2017 | Siomina | H04L 41/0803 |
| 2021/0273735 | A1* | 9/2021 | Da Silva | H04W 48/16 |
| 2024/0283510 | A1* | 8/2024 | Lim | H04B 7/0626 |
| 2024/0353522 | A1* | 10/2024 | Ding | G01S 7/006 |
| 2025/0052882 | A1* | 2/2025 | Luo | G01S 7/006 |
| 2025/0097755 | A1* | 3/2025 | Jiang | H04W 36/16 |
| 2025/0211308 | A1* | 6/2025 | Du | G01S 7/006 |
| 2025/0234306 | A1* | 7/2025 | Yuk | H04B 17/328 |

* cited by examiner

*Primary Examiner* — Abdelnabi O Musa

(74) *Attorney, Agent, or Firm* — Andy M. Han; Han IP PLLC

(57) ABSTRACT

Techniques pertaining to wireless local area network (WLAN) sensing measurement report regarding receive (Rx) signal-to-noise ratio (SNR) in wireless communications are described. A sensing receiver is configured to perform a sensing measurement and generate a sensing measurement report. The sensing measurement report includes an Rx_SNR subfield indicating a Rx signal quality used in a channel state information (CSI) estimation.

12 Claims, 7 Drawing Sheets

200

(A)

Table 27-47—Transmit power and RSSI measurement accuracy

| Parameter | Minimum Requirement | | Comments |
|---|---|---|---|
| | Class A | Class B | |
| Absolute transmit power accuracy | ±3 dB | ±9 dB | Accuracy of achieving a specified transmit power. |
| RSSI measurement accuracy | ±3 dB | ±5 dB | The difference between the RSSI and the received power.<br><br>Requirements are valid from minimum receive to maximum receive input power. |
| Relative transmit power accuracy | N/A | ±3 dB | Accuracy of achieving a change in transmit power for consecutive HE TB PPDU.<br><br>The relative transmit power accuracy is applicable only to Class B devices. |

(B)

Table 27-1—TXVECTOR and RXVECTOR parameters *(continued)*

| Parameter | Condition | Value | TXVECTOR | RXVECTOR |
|---|---|---|---|---|
| SNR | FORMAT is HE_SU and PSDU_LENGTH is 0 | Contains an array of average values of received SNR measurements for each spatial stream. SNR indications of 8 bits are supported. Average value of SNR shall be the sum of the decibel values of SNR per subcarrier divided by the number of subcarriers represented in each stream as described in 9.4.1.65 (HE Compressed Beamforming Report field). | N | Y |
| | FORMAT is HE_MU, HE_ER_SU or HE_TB, or FORMAT is HE_SU and PSDU_LENGTH is greater than 0 | Not present. | N | N |
| | Otherwise | See corresponding entry in Table 19-1 (TXVECTOR and RXVECTOR parameters) or Table 21-1 (TXVECTOR and RXVECTOR parameters). | | |

FIG. 2

300

(A)

$$Rx\_SNR = \sum_{i=1}^{N_{rx}} \left( 10log_{10} \sum_{k=1}^{N_{sc}} S_{i,k} - 10log_{10} \sum_{k=1}^{N_{sc}} N_{i,k} \right) / N_{rx} \quad \text{(Eqn. 1)}$$

$$Rx\_SNR = 10log_{10} \left( \sum_{i=1}^{N_{rx}} \sum_{k=1}^{N_{sc}} S_{i,k} \right) - 10log_{10} \left( \sum_{i=1}^{N_{rx}} \sum_{k=1}^{N_{sc}} N_{i,k} \right) \quad \text{(Eqn. 2)}$$

(B)

$$Rx\_SNR_i = 10log_{10} \sum_{k=1}^{N_{sc}} S_{i,k} - 10log_{10} \sum_{k=1}^{N_{sc}} N_{i,k} \quad \text{(Eqn. 3)}$$

FIG. 3

400

Table 9-105—Average SNR of Space-Time Stream i subfield

| Average SNR of Space-Time Stream i subfield | $AvgSNR_i$ |
|---|---|
| -128 | ≤ -10 dB |
| -127 | -9.75 dB |
| -126 | -9.5 dB |
| ... | ... |
| +126 | 53.5 dB |
| +127 | ≥ 53.75 dB |

Table 1 — Average Rx_SNR subfield in sensing measurement report field

| Rx_SNR reported | *Rx_SNR measured* |
|---|---|
| -128 | ≤ - 10 dB |
| -127 | -9.75 dB |
| -126 | -9.5 dB |
| ... | ... |
| +126 | 53.5 dB |
| +127 | ≥ 53.75 dB |

FIG. 4

WLAN SENSING MEASUREMENT REPORT REGARDING RECEIVER SNR

CROSS REFERENCE TO RELATED PATENT APPLICATION

The present disclosure is part of a non-provisional patent application claiming the priority benefit of U.S. Provisional Patent Application No. 63/479,555, filed 12 Jan. 2023, the content of which herein being incorporated by reference in its entirety.

TECHNICAL FIELD

The present disclosure is generally related to wireless communications and, more particularly, to wireless local area network (WLAN) sensing measurement report regarding receive (Rx) signal-to-noise ratio (SNR) in wireless communications.

BACKGROUND

Unless otherwise indicated herein, approaches described in this section are not prior art to the claims listed below and are not admitted as prior art by inclusion in this section.

In wireless communications, such as WiFi (or Wi-Fi) and WLANs in accordance with Institute of Electrical and Electronics Engineers (IEEE) 802.11 standards, there may be some IEEE 802.11 bf sensing use cases in which a sensing initiator requires multiple receivers to report channel status information (CSI) for better sensing performance. In IEEE 802.11 bf, accuracy of the received signal strength indicator (RSSI) is defined in Table 27-47, pertaining to transmit power and RSSI measurement accuracy, as +/−3 dB for class A devices and +/−5 dB for class B devices.

Arguably, given the coarse accuracy of RSSI, reporting only the RSSI might not be adequately sufficient to indicate signal quality especially when reported RSSI values are close to each other. It would be necessary for a receiver to also report its SNR value in sensing measurement report. This is because the step size of RSSI is 1 dB while the step size of SNR is 0.25 dB for a compressed beamforming report. Therefore, there is a need for a solution of WLAN sensing measurement report regarding Rx SNR.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to WLAN sensing measurement report regarding Rx SNR in wireless communications. Under various proposed schemes in accordance with the present disclosure, a sensing initiator may use the reported SNR value to indicate the Rx SNR for CSI estimates, use the RSSI value to indicate Rx signal strength for CSI estimates, and use Rx_OP_Gain_Index to indicate receiver operating conditions for CSI estimates. With all such information, a sensing application may compare and combine CSI estimates more reliably, thereby improving sensing performance. Thus, it is believed that various schemes proposed herein may address or otherwise alleviate aforementioned issue(s).

In one aspect, a method may involve performing a sensing measurement. The method may also involve generating a sensing measurement report which includes a receive (Rx) signal-to-noise ratio (Rx_SNR) subfield indicating a Rx signal quality used in a CSI estimation.

In another aspect, a method may involve a sensing initiator requesting a sensing measurement report from a sensing responder. The method may also involve the sensing initiator receiving the sensing measurement report responsive to the requesting. The sensing measurement report may include a Rx_SNR subfield indicating a Rx signal quality used in a CSI estimation It is noteworthy that, although description provided herein may be in the context of certain radio access technologies, networks and network topologies such as, WLAN, the proposed concepts, schemes and any variation(s)/derivative(s) thereof may be implemented in, for and by other types of radio access technologies, networks and network topologies such as, for example and without limitation, Bluetooth, ZigBee, $5^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 2 shows an example of RSSI measurement accuracy and SNR as defined in IEEE 802.11ax.

FIG. 3 shows an example of various equations for Rx_SNR calculation under the proposed scheme.

FIG. 4 shows an example of Rx_SNR report under the proposed scheme.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

OVERVIEW

Implementations in accordance with the present disclosure relate to various techniques, methods, schemes and/or solutions pertaining to WLAN sensing measurement report regarding Rx SNR in wireless communications. According to the present disclosure, a number of possible solutions may be implemented separately or jointly. That is, although these possible solutions may be described below separately, two or more of these possible solutions may be implemented in one combination or another.

Figure 1:
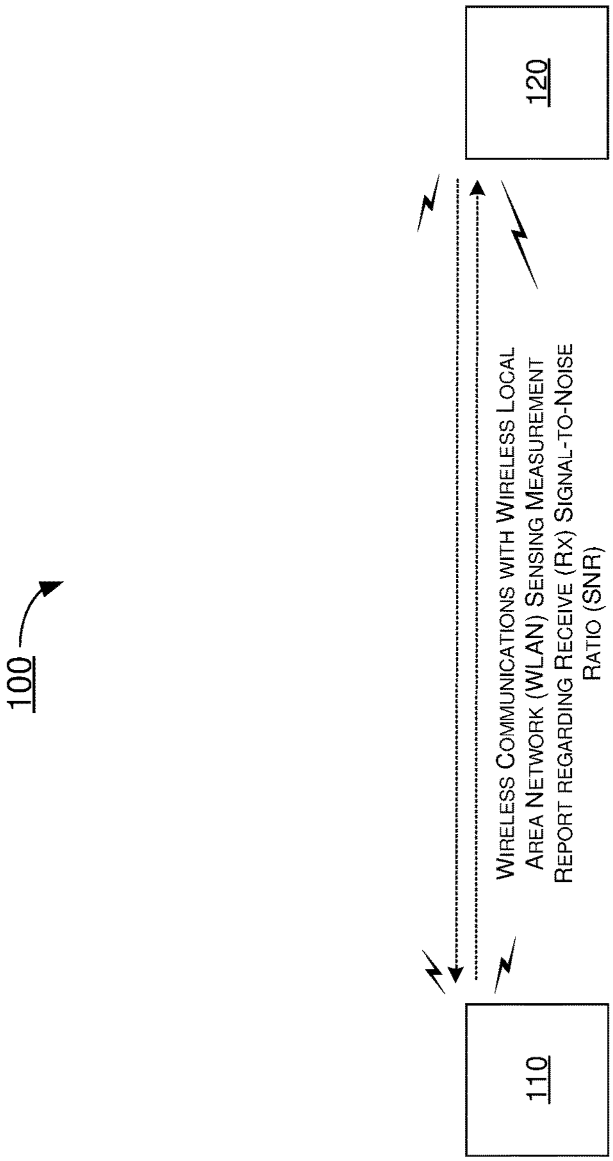
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 7 illustrate examples of implementation of various proposed schemes in network environment 100 in accordance with the present disclosure. The following description of various proposed schemes is provided with reference to FIG. 1~FIG. 7.

Referring to FIG. 1, network environment 100 may involve at least a station (STA) 110 communicating wirelessly with a STA 120. Either of STA 110 and STA 120 may be an access point (AP) STA or, alternatively, either of STA 110 and STA 120 may function as a non-AP STA. In some cases, STA 110 and STA 120 may be associated with a basic service set (BSS) in accordance with one or more IEEE 802.11 standards (e.g., IEEE 802.11 be and future-developed standards). Each of STA 110 and STA 120 may be configured to communicate with each other by utilizing the various proposed schemes described below. It is noteworthy that, while the various proposed schemes may be individually or separately described below, in actual implementations some or all of the proposed schemes may be utilized or otherwise implemented jointly. Of course, each of the proposed schemes may be utilized or otherwise implemented individually or separately.

FIG. 2 illustrates an example 200 of RSSI measurement accuracy and SNR as defined in IEEE 802.11ax. Referring to part (A) of FIG. 2, RSSI measurement accuracy is defined in Table 27-47 of the IEEE 802.11ax specification for uplink (UL) trigger-based (TB) physical-layer protocol data unit (PPDU) transmission. The absolute transmit power accuracy is applicable for the entire range of transmit power that a STA (e.g., STA 110 or STA 120) is intending to use for the current band of operation. The RSSI accuracy requirements may be applied to receive signal level range from −82 dBm to −20 dBm in the 2.4 GHz band and −82 dBm to −30 dBm in the 5 GHz and 6 GHz bands. The requirements are for nominal (room) temperature conditions, and the RSSI may be measured during the reception of the non-high efficiency (non-HE) portion of a HE PPDU preamble. As defined in Table 27-47, RSSI measurement accuracy is +/−3 dB for class A devices and +/−5 dB for class B devices. Referring to part (B) of FIG. 2, SNR as defined in Table 27-1 of the IEEE 802.11ax specification is an average of values of received SNR measurements for each spatial stream (ss). It is reported in the HE compressed beamforming report field. Normally, SNR per spatial stream is calculated using the power of each eigen value after singular value decomposition (SVD) is performed on CSI matrix.

As can be seen, the SNR definition in the IEEE 802.11 ax specification is not proper for sensing requirement. That is, SNR per spatial stream in IEEE 802.11 ax is calculated for transmit beamforming (TxBF) feedback purpose and thus requires SVD. On the other hand, CSI in sensing measurement reports are not compressed, and it is not necessary for the sensing receiver (of a sensing responder) to perform SVD in order to report SNR in its sensing measurement report in IEEE 802.11 bf.

In view of the above-described issue, under proposed schemes in accordance with the present disclosure, a sensing receiver's averaged SNR may be redefined without performing SVD in IEEE 802.11 bf and, moreover, a subfield Rx_SNR may be added in the sensing measurement report. Under the proposed schemes, the sensing averaged SNR may be redefined as a signal-to-noise ratio in dB per receiver instead of per spatial stream. No SVD needs to be performed. Furthermore, the sensing averaged SNR may provide a good indication of the signal quality of the receiver for CSI estimates. Detailed description of the proposed schemes is provided below.

Under a proposed scheme in accordance with the present disclosure, a subfield, Rx_SNR, may be added to the IEEE 802.11 bf sensing measurement report field to indicate Rx signal quality for CSI estimation. The value in the Rx_SNR subfield may reflect an average of Rx signal-to-noise ratios measured in decibel (dB) on HE long training fields (HE-LTFs) or extremely-high-throughput (EHT) long training fields (EHT-LTFs) used for sensing CSI estimations. Under the proposed scheme, there may be two alternative options (Option 1 A and Option 1 B) to calculate the value of the Rx_SNR subfield in the sensing measurement report field. That is, the Rx_SNR may be an average of Rx signal-to-noise ratios measured in dB by averaging overall receiver chains. More specifically, $Rx\_SNR_i$ may be an average of Rx signal-to-noise ratios measured in dB for an $i^{th}$ receiver chain, and the $Rx\_SNR_i$ may be calculated as $Rx\_SNR_i=10/\log_{10}(S_i/N_i)$. The signal power ($S_i$) and noise power ($N_i$) may be accumulated over all the occupied subcarriers in the entire applicable bandwidth for CSI estimation. In case that the bandwidth for CSI estimation is punctured, $Rx\_SNR_i$ may be averaged over all of one or more segments of frequency band for which CSIs are estimated. For simplicity, Equation 1, Equation 2 and Equation 3 shown in FIG. 3 may be utilized. In case that $SNR_{i,s}$ is calculated for each sub-band (with "s" denoting sub-band index), the methods of calculating Rx_SNR in Equation 1 and Equation 2 may also be applied in this case, and $SNR_{i,s}$ may need to be averaged over the one or more segments of frequency band for which CSIs are estimated in order to derive the average Rx_SNR.

FIG. 3 illustrates an example 300 of various equations for Rx_SNR calculation under the proposed scheme. Part (A) of FIG. 3 shows alternative equations, Equation 1 and Equation 2, for calculating Rx_SNR by averaging SNRs over all Rx chains under Option 1A. Part (B) of FIG. 3 shows Equation 3 for calculating Rx_SNR per receiver chain under Option 1B. Under Option 1A, Rx_SNR may be calculated by averaging SNRs in dB (Equation 1) or in linear (Equation 2) across all receiver chains to provide one Rx_SNR value to be reported in a sensing measurement report field. Under Option 1 B, $Rx\_SNR_i$ may be calculated (Equation 3) and reported in a sensing measurement report field for the $i^{th}$ receiver chain. In the equation, i denotes the index of a receiver chain, $i=1, \ldots, N_{rx}$; k denotes the index of occupied subcarrier in a frequency band or band segments in which CSI estimation is performed, k=1, . . . , $N_{sc}$; $N_{rx}$ denotes the number of sensing receivers; $N_{sc}$ denotes the number of occupied subcarriers in the band or band segments in which CSI estimation is performed; $S_{i,k}$ denotes signal power for kth occupied subcarrier at the $i^{th}$ receiver; and $N_{i,k}$ denotes the noise power for kth occupied subcarrier at the $i^{th}$ receiver.

Under another proposed scheme in accordance with the present disclosure, the Rx_SNR subfield may be an 8-bit subfield in the sensing measurement report field. That is, the value of Rx_SNR may represent values from −128 to +127. In Option 1 B, where $Rx\_SNR_i$ is reported for the $i^{th}$ receiver chain, each $Rx\_SNR_i$ is an 8-bit subfield in the sensing measurement report field.

FIG. 4 illustrates an example 400 of Rx_SNR report under the proposed scheme. Referring to FIG. 4, IEEE 802.11bf may define step size and mapping of sensing Rx_SNR following the format in Table 9-105 specified for SNR per space-time in IEEE 802.11ax. Also shown in FIG. 4, Table 1 shows a mapping of Rx_SNR reported value to Rx_SNR measured in dB with a step size of 0.25 dB, and a value range from −10 dB to 53.75 dB. For instance, a value of −128 in the Rx_SNR subfield may indicate that the Rx_SNR measured is less than or equal to −10 dB or not available, a value of −127 in the Rx_SNR subfield may indicate that the Rx_SNR measured is −9.75 dB, and so on and up to a value of +127 which may indicate that the Rx_SNR measured is greater than or equal to 53.75 dB, with a step size of 0.25 dB. It is noteworthy that the mapping of Rx_SNR reported value to Rx_SNR measured value in dB may not be limited to the example shown in Table 1. For instance, as an alternative, a mapping to measured value range x+[−10, 53.75] in dBs with a step size of 0.25 dB may be utilized, with x denoting an offset in number of quarter decibels. Still alternatively, a mapping range using a different step size (e.g., 0.5 dB) may be utilized.

ILLUSTRATIVE IMPLEMENTATIONS

Figure 5:
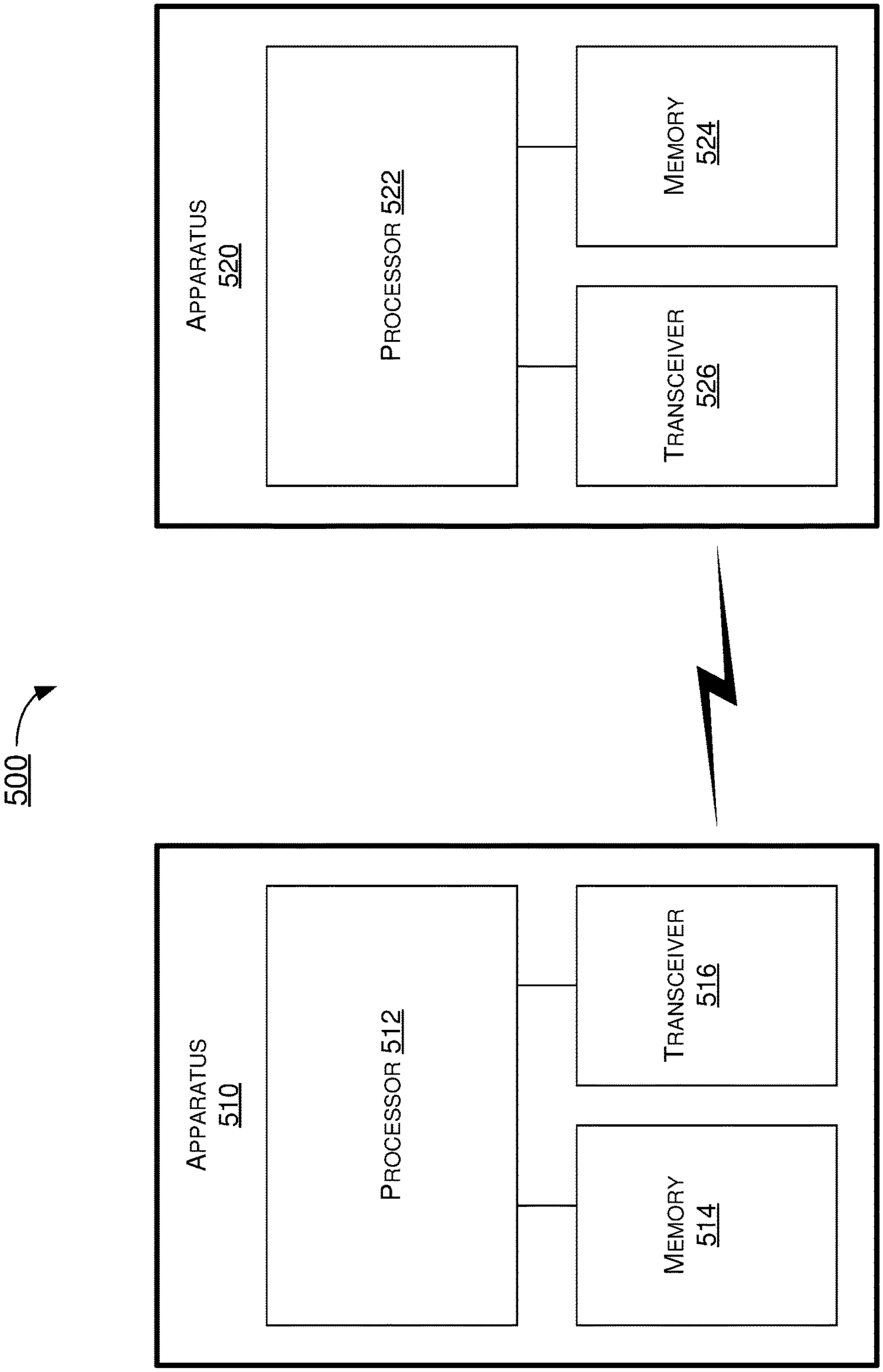
FIG. 5 is a block diagram of an example communication system in accordance with an implementation of the present disclosure.

FIG. 5 illustrates an example system 500 having at least an example apparatus 510 and an example apparatus 520 in accordance with an implementation of the present disclosure. Each of apparatus 510 and apparatus 520 may perform various functions to implement schemes, techniques, processes and methods described herein pertaining to WLAN sensing measurement report regarding Rx SNR in wireless communications, including the various schemes described above with respect to various proposed designs, concepts, schemes, systems and methods described above as well as processes described below. For instance, apparatus 510 may be implemented in STA 110 and apparatus 520 may be implemented in STA 120, or vice versa.

Each of apparatus 510 and apparatus 520 may be a part of an electronic apparatus, which may be a non-AP STA or an AP STA, such as a portable or mobile apparatus, a wearable apparatus, a wireless communication apparatus or a computing apparatus. When implemented in a STA, each of apparatus 510 and apparatus 520 may be implemented in a smartphone, a smart watch, a personal digital assistant, a digital camera, or a computing equipment such as a tablet computer, a laptop computer or a notebook computer. Each of apparatus 510 and apparatus 520 may also be a part of a machine type apparatus, which may be an IoT apparatus such as an immobile or a stationary apparatus, a home apparatus, a wire communication apparatus or a computing apparatus. For instance, each of apparatus 510 and apparatus 520 may be implemented in a smart thermostat, a smart fridge, a smart door lock, a wireless speaker or a home control center. When implemented in or as a network apparatus, apparatus 510 and/or apparatus 520 may be implemented in a network node, such as an AP in a WLAN.

In some implementations, each of apparatus 510 and apparatus 520 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 510 and apparatus 520 may be implemented in or as a STA or an AP. Each of apparatus 510 and apparatus 520 may include at least some of those components shown in FIG. 5 such as a processor 512 and a processor 522, respectively, for example. Each of apparatus 510 and apparatus 520 may further include one or more other components not pertinent to the proposed scheme of the present disclosure (e.g., internal power supply, display device and/or user interface device), and, thus, such component(s) of apparatus 510 and apparatus 520 are neither shown in FIG. 5 nor described below in the interest of simplicity and brevity.

In one aspect, each of processor 512 and processor 522 may be implemented in the form of one or more single-core processors, one or more multi-core processors, one or more RISC processors or one or more CISC processors. That is, even though a singular term “a processor” is used herein to refer to processor 512 and processor 522, each of processor 512 and processor 522 may include multiple processors in some implementations and a single processor in other implementations in accordance with the present disclosure. In another aspect, each of processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 512 and processor 522 is a special-purpose machine specifically designed, arranged and configured to perform specific tasks including those pertaining to WLAN sensing measurement report regarding Rx SNR in wireless communications in accordance with various implementations of the present disclosure.

In some implementations, apparatus 510 may also include a transceiver 516 coupled to processor 512. Transceiver 516 may include a transmitter capable of wirelessly transmitting and a receiver capable of wirelessly receiving data. In some implementations, apparatus 520 may also include a transceiver 526 coupled to processor 522. Transceiver 526 may include a transmitter capable of wirelessly transmitting and a receiver capable of wirelessly receiving data. It is noteworthy that, although transceiver 516 and transceiver 526 are illustrated as being external to and separate from processor 512 and processor 522, respectively, in some implementations, transceiver 516 may be an integral part of processor 512 as a system on chip (SoC), and transceiver 526 may be an integral part of processor 522 as a SoC.

In some implementations, apparatus 510 may further include a memory 514 coupled to processor 512 and capable of being accessed by processor 512 and storing data therein. In some implementations, apparatus 520 may further include a memory 524 coupled to processor 522 and capable of being accessed by processor 522 and storing data therein.

Each of memory 514 and memory 524 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 514 and memory 524 may include a type of read-only memory (ROM) such as mask ROM, programmable ROM (PROM), erasable programmable ROM (EPROM) and/or electrically erasable programmable ROM (EEPROM). Alternatively, or additionally, each of memory 514 and memory 524 may include a type of non-volatile random-access memory (NVRAM) such as flash memory, solid-state memory, ferroelectric RAM (FeRAM), magnetoresistive RAM (MRAM) and/or phase-change memory.

Each of apparatus 510 and apparatus 520 may be a communication entity capable of communicating with each other using various proposed schemes in accordance with the present disclosure. For illustrative purposes and without limitation, a description of capabilities of apparatus 510, as STA 110, and apparatus 520, as STA 120, is provided below in the context of example processes 600 and 700. It is noteworthy that, although a detailed description of capabilities, functionalities and/or technical features of one of apparatus 510 and apparatus 520 is provided below, the same may be applied to the other of apparatus 510 and apparatus 520 although a detailed description thereof is not provided solely in the interest of brevity. It is also noteworthy that, although the example implementations described below are provided in the context of WLAN, the same may be implemented in other types of networks.

ILLUSTRATIVE PROCESSES

Figure 6:
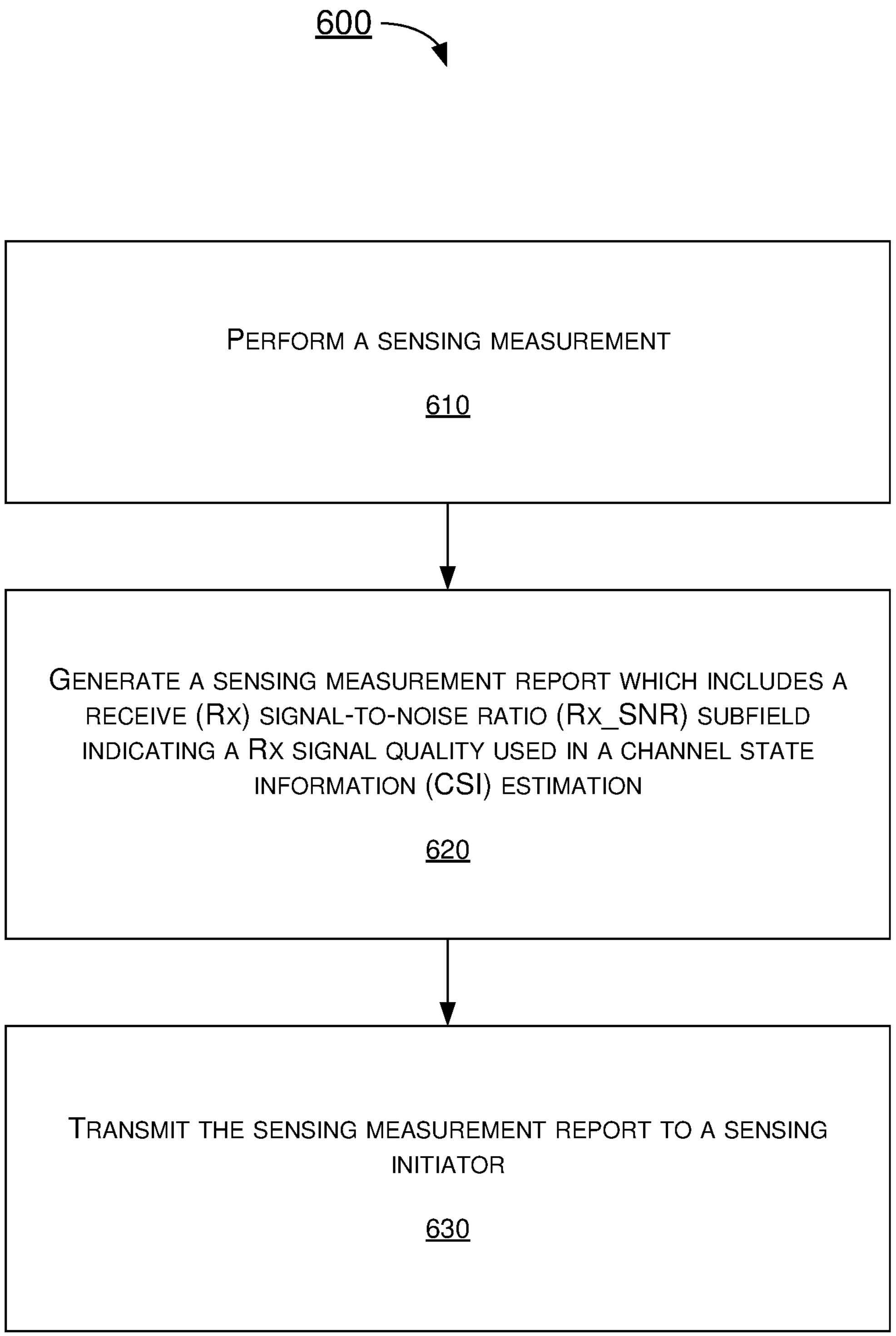
FIG. 6 is a flowchart of an example process in accordance with an implementation of the present disclosure.

FIG. 6 illustrates an example process 600 in accordance with an implementation of the present disclosure. Process 600 may represent an aspect of implementing various proposed designs, concepts, schemes, systems and methods described above. More specifically, process 600 may represent an aspect of the proposed concepts and schemes pertaining to WLAN sensing measurement report regarding Rx SNR in wireless communications in accordance with the present disclosure. Process 600 may include one or more operations, actions, or functions as illustrated by one or more of blocks 610, 620 and 630. Although illustrated as discrete blocks, various blocks of process 600 may be divided into additional blocks, combined into fewer blocks, or eliminated, depending on the desired implementation. Moreover, the blocks/sub-blocks of process 600 may be executed in the order shown in FIG. 6 or, alternatively, in a different order. Furthermore, one or more of the blocks/sub-blocks of process 600 may be executed repeatedly or iteratively. Process 600 may be implemented by or in apparatus 510 and apparatus 520 as well as any variations thereof. Solely for illustrative purposes and without limiting the scope, process 600 is described below in the context of apparatus 510 implemented in or as STA 110 functioning as a sensing responder (e.g., as a non-AP STA or an AP STA) and apparatus 520 implemented in or as STA 120 functioning as a sensing initiator (e.g., as an AP STA or a non-AP STA) of a wireless network such as a WLAN in network environment 100 in accordance with one or more of IEEE 802.11 standards. Process 600 may begin at block 610.

At 610, process 600 may involve processor 512 of apparatus 510 performing, via transceiver 516, a sensing measurement (e.g., in response to being triggered by apparatus 520). Process 600 may proceed from 610 to 620.

At 620, process 600 may involve processor 512 generating a sensing measurement report which includes a Rx_SNR subfield indicating a Rx signal quality used in a CSI estimation. Process 600 may proceed from 620 to 630.

At 630, process 600 may involve processor 512 transmitting, via transceiver 516, the sensing measurement report to apparatus 520.

In some implementations, in generating the sensing measurement report, process 600 may involve processor 512 calculating a value of the Rx_SNR subfield as an average of Rx signal-to-noise ratios measured in dB on HE-LTFs or EHT-LTFs.

In some implementations, in generating the sensing measurement report, process 600 may involve processor 512 calculating a value of the Rx_SNR subfield as an average of Rx signal-to-noise ratios measured in dB by averaging overall receiver chains.

In some implementations, in calculating the value of the Rx_SNR subfield, process 600 may involve processor 512 calculating the value of the Rx_SNR subfield as:

$$\text{Rx\_SNR} = \sum_{i=1}^{N_{rx}}\left(10log_{10}\sum_{k=1}^{N_{sc}}S_{i,k} - 10\log_{10}\sum_{k=1}^{N_{sc}}N_{i,k}\right)/N_{rx}$$

Alternatively, in calculating the value of the Rx_SNR subfield, process 600 may involve processor 512 calculating the value of the Rx_SNR subfield as:

$$\text{Rx\_SNR} = 10log_{10}\left(\sum_{i=1}^{N_{rx}}\sum_{k=1}^{N_{sc}}S_{i,k}\right) - 10log_{10}\left(\sum_{i=1}^{N_{rx}}\sum_{k=1}^{N_{sc}}N_{i,k}\right)$$

In the above equations, i denotes an index of a receiver chain, i=1, . . . , $N_{rx}$; k denotes an index of occupied subcarrier in a frequency band or band segments in which the CSI estimation is performed, k=1, . . . , $N_{sc}$; $N_{rx}$ denotes a number of sensing receivers; $N_{sc}$ denotes a number of occupied subcarriers in the frequency band or band segments in which the CSI estimation is performed; $S_{i,k}$ denotes a signal power for a $k^{th}$ occupied subcarrier at an $i^{th}$ receiver; and $N_{i,k}$ denotes a noise power for the $k^{th}$ occupied subcarrier at the $i^{th}$ receiver.

In some implementations, in generating the sensing measurement report, process 600 may involve processor 512 calculating a value of the Rx_SNR subfield reflecting $\text{Rx\_SNR}_i$ as an average of Rx signal-to-noise ratios measured in dB for an $i^{th}$ receiver chain, with the $\text{Rx\_SNR}_i$ calculated as $\text{Rx\_SNR}_i=10/\log_{10}(S_i/N_i)$. Here, $S_i$ and $N_i$ denote a signal power and a noise power, respectively, accumulated over all occupied subcarriers in an applicable bandwidth for CSI estimation.

In some implementations, in calculating the value of the Rx_SNR subfield, process 600 may involve processor 512 calculating the value of the Rx_SNR subfield as:

$$\text{Rx\_SNR}_i = 10log_{10}\sum_{k=1}^{N_{sc}}S_{i,k} - 10\log_{10}\sum_{k=1}^{N_{sc}}N_{i,k}$$

In the above equation, i denotes an index of a receiver chain, i=1, . . . , $N_{rx}$; k denotes an index of occupied subcarrier in a frequency band or band segments in which the CSI estimation is performed, k=1, . . . , $N_{sc}$; $N_{rx}$ denotes a number of sensing receivers; $N_{sc}$ denotes a number of occupied subcarriers in the frequency band or band segments in which the CSI estimation is performed; $S_{i,k}$ denotes a signal power for a $k^{th}$ occupied subcarrier at an $i^{th}$ receiver; and $N_{i,k}$ denotes a noise power for the $k^{th}$ occupied subcarrier at the $i^{th}$ receiver.

In some implementations, in response to the applicable bandwidth for CSI estimation being punctured, the $Rx\_SNR_i$ may be averaged over one or more segments of a frequency band for which CSIs are estimated.

In some implementations, the Rx_SNR subfield may include an 8-bit subfield, and a value of the Rx_SNR subfield may be mapped to an Rx SNR measured in dB with a step size of 0.25 dB, 0.5 dB or a different size. In some implementations, the value of the Rx_SNR subfield may be mapped to a measured value range of x+[−10, 53.75] in dBs, and x may denote an offset in a number of quarter dBs.

Figure 7:
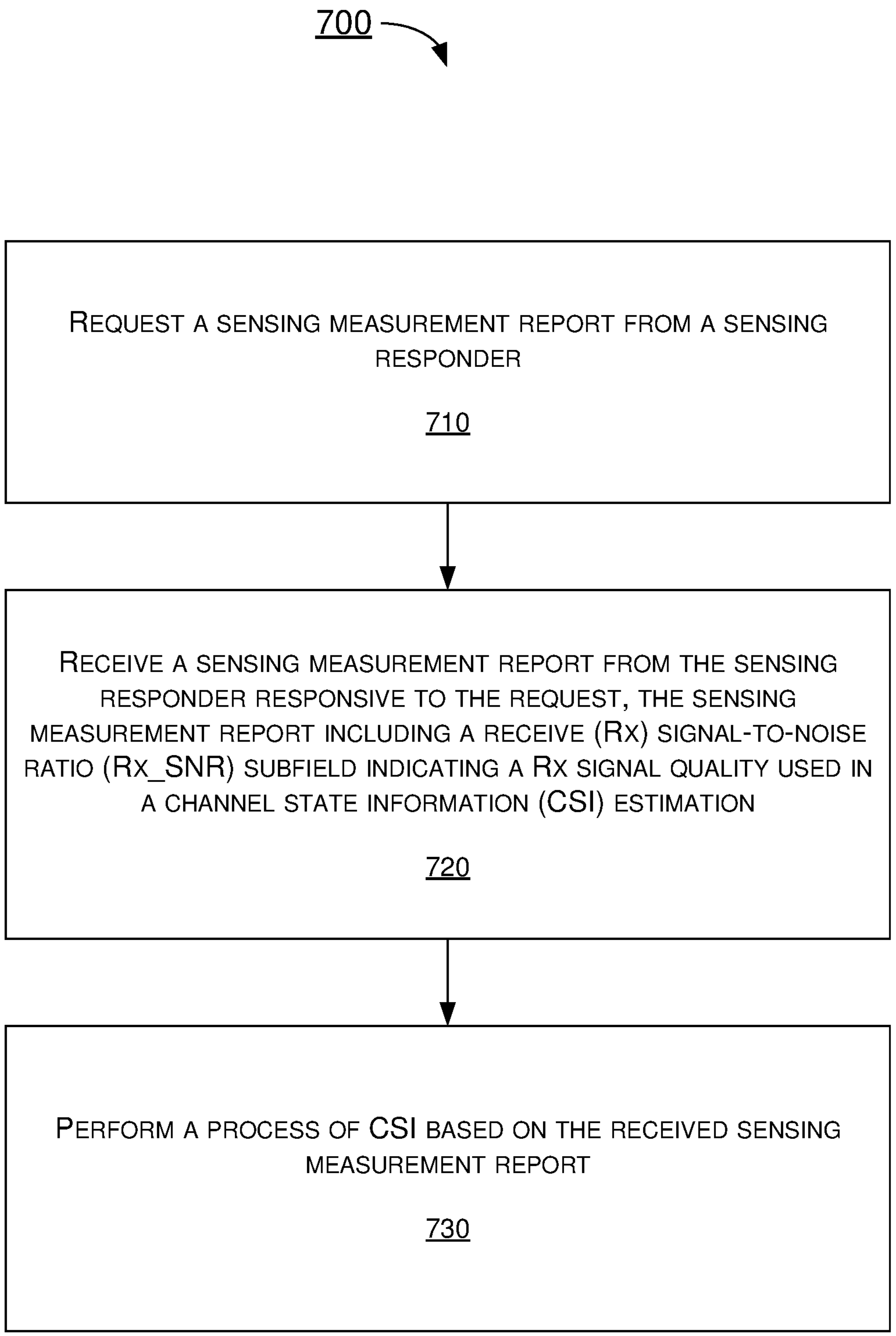
FIG. 7 is a flowchart of an example process in accordance with an implementation of the present disclosure.

FIG. 7 illustrates an example process 700 in accordance with an implementation of the present disclosure. Process 700 may represent an aspect of implementing various proposed designs, concepts, schemes, systems and methods described above. More specifically, process 700 may represent an aspect of the proposed concepts and schemes pertaining to WLAN sensing measurement report regarding Rx SNR in wireless communications in accordance with the present disclosure. Process 700 may include one or more operations, actions, or functions as illustrated by one or more of blocks 710, 720 and 730. Although illustrated as discrete blocks, various blocks of process 700 may be divided into additional blocks, combined into fewer blocks, or eliminated, depending on the desired implementation. Moreover, the blocks/sub-blocks of process 700 may be executed in the order shown in FIG. 7 or, alternatively, in a different order. Furthermore, one or more of the blocks/sub-blocks of process 700 may be executed repeatedly or iteratively. Process 700 may be implemented by or in apparatus 510 and apparatus 520 as well as any variations thereof. Solely for illustrative purposes and without limiting the scope, process 700 is described below in the context of apparatus 510 implemented in or as STA 110 functioning as a sensing responder (e.g., as a non-AP STA or an AP STA) and apparatus 520 implemented in or as STA 120 functioning as a sensing initiator (e.g., as an AP STA or a non-AP STA) of a wireless network such as a WLAN in network environment 100 in accordance with one or more of IEEE 802.11 standards. Process 700 may begin at block 710.

At 710, process 700 may involve processor 522 of apparatus 520 requesting, via transceiver 526, a sensing measurement report from a sensing responder (e.g., apparatus 510). Process 700 may proceed from 710 to 720.

At 720, process 700 may involve processor 522 receiving, via transceiver 526, a sensing measurement report from the sensing responder in response to the requesting. The sensing measurement report may include a Rx_SNR subfield indicating a Rx signal quality used in a CSI estimation. Process 700 may proceed from 720 to 730.

At 730, process 700 may involve processor 522 performing, via transceiver 526, a process of the CSI based on the received sensing measurement report.

In some implementations, a value of the Rx_SNR subfield may be calculated as an average of Rx signal-to-noise ratios measured in dB on HE-LTFs or EHT-LTFs.

In some implementations, a value of the Rx_SNR subfield may be calculated as an average of Rx signal-to-noise ratios measured in dB by averaging overall receiver chains.

In some implementations, the value of the Rx_SNR subfield may be calculated as:

$$Rx\_SNR = \sum_{i=1}^{N_{rx}}\left(10 log_{10}\sum_{k=1}^{N_{sc}} S_{i,k} - 10\log_{10}\sum_{k=1}^{N_{sc}} N_{i,k}\right)/N_{rx}$$

Alternatively, the value of the Rx_SNR subfield may be calculated as:

$$Rx\_SNR = 10 log_{10}\left(\sum_{i=1}^{N_{rx}}\sum_{k=1}^{N_{sc}} S_{i,k}\right) - 10 log_{10}\left(\sum_{i=1}^{N_{rx}}\sum_{k=1}^{N_{sc}} N_{i,k}\right)$$

In the above equations, i denotes an index of a receiver chain, i=1, . . . , $N_{rx}$; k denotes an index of occupied subcarrier in a frequency band or band segments in which the CSI estimation is performed, k=1, . . . , $N_{sc}$; $N_{rx}$ denotes a number of sensing receivers; $N_{sc}$ denotes a number of occupied subcarriers in the frequency band or band segments in which the CSI estimation is performed; $S_{i,k}$ denotes a signal power for a $k^{th}$ occupied subcarrier at an $i^{th}$ receiver; and $N_{i,k}$ denotes a noise power for the $k^{th}$ occupied subcarrier at the $i^{th}$ receiver.

In some implementations, a value of the Rx_SNR subfield may reflect $Rx\_SNR_i$ as an average of Rx signal-to-noise ratios measured in dB for an $i^{th}$ receiver chain, with the $Rx\_SNR_i$ calculated as $Rx\_SNR_i = 10/\log_{10}(S_i/N_i)$. Here, $S_i$ and $N_i$ may denote a signal power and a noise power, respectively, accumulated over all occupied subcarriers in an applicable bandwidth for CSI estimation.

In some implementations, the value of the Rx_SNR subfield may be calculated as:

$$Rx\_SNR_i = 10 log_{10}\sum_{k=1}^{N_{sc}} S_{i,k} - 10\log_{10}\sum_{k=1}^{N_{sc}} N_{i,k}$$

In the above equation, i denotes an index of a receiver chain, i=1, . . . , $N_{rx}$; k denotes an index of occupied subcarrier in a frequency band or band segments in which the CSI estimation is performed, k=1, . . . , $N_{sc}$; $N_{rx}$ denotes a number of sensing receivers; $N_{sc}$ denotes a number of occupied subcarriers in the frequency band or band segments in which the CSI estimation is performed; $S_{i,k}$ denotes a signal power for a $k^{th}$ occupied subcarrier at an $i^{th}$ receiver; and $N_{i,k}$ denotes a noise power for the $k^{th}$ occupied subcarrier at the $i^{th}$ receiver.

In some implementations, in response to the applicable bandwidth for CSI estimation being punctured, the $Rx\_SNR_i$ may be averaged over one or more segments of a frequency band for which CSIs are estimated.

In some implementations, the Rx_SNR subfield may include an 8-bit subfield, and a value of the Rx_SNR subfield may be mapped to an Rx SNR measured in dB with a step size of 0.25 dB, 0.5 dB or a different size. In some implementations, the value of the Rx_SNR subfield may be mapped to a measured value range of x+[−10, 53.75] in dBs, and x may denote an offset in a number of quarter dBs.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

performing a sensing measurement; and generating a sensing measurement report which includes a receive (Rx) signal-to-noise ratio (Rx_SNR) subfield indicating a Rx signal quality used in a channel state information (CSI) estimation, wherein the generating of the sensing measurement report comprises calculating a value of the Rx SNR subfield as an average of Rx signal-to-noise ratios measured in dB by averaging overall receiver chains, wherein the calculating of the value of the Rx SNR subfield comprises calculating the value of the Rx SNR subfield as:

$$\text{Rx\_SNR} = \sum_{i=1}^{N_{rx}} \left(10 log_{10} \sum_{k=1}^{N_{sc}} S_{i,k} - 10 \log_{10} \sum_{k=1}^{N_{sc}} N_{i,k}\right) / N_{rx}$$

wherein:

i denotes an index of a receiver chain, i=1, . . . , $N_{rx}$;

k denotes an index of occupied subcarrier in a frequency band or band segments in which the CSI estimation is performed, k=1, . . . , $N_{sc}$;

$N_{rx}$ denotes a number of sensing receivers;

$N_{sc}$ denotes a number of occupied subcarriers in the frequency band or band segments in which the CSI estimation is performed;

$S_{i,k}$ denotes a signal power for a $k^{th}$ occupied subcarrier at an $i^{th}$ receiver; and $N_{i,k}$ denotes a noise power for the $k^{th}$ occupied subcarrier at the $i^{th}$ receiver.

2. The method of claim 1, wherein the generating of the sensing measurement report comprises calculating a value of the Rx_SNR subfield as an average of Rx signal-to-noise ratios measured in decibel (dB) on high-efficiency (HE) long training fields (HE-LTFs) or extremely-high-throughput (EHT) long training fields (EHT-LTFs).

3. The method of claim 1, wherein the Rx_SNR subfield comprises an 8-bit subfield, and wherein a value of the Rx_SNR subfield is mapped to an Rx SNR measured in decibel (dB) with a step size of 0.25 dB, 0.5 dB or a different size.

4. The method of claim 3, wherein the value of the Rx_SNR subfield is mapped to a measured value range of x+[−10, 53.75] in dBs, and wherein x denotes an offset in a number of quarter dBs.

5. A method, comprising:

performing a sensing measurement; and generating a sensing measurement report which includes a receive (Rx) signal-to-noise ratio (Rx SNR) subfield indicating a Rx signal quality used in a channel state information (CSI) estimation, wherein the generating of the sensing measurement report comprises calculating a value of the Rx SNR subfield as an average of Rx signal-to-noise ratios measured in dB by averaging overall receiver chains, wherein the calculating of the value of the Rx_SNR subfield comprises calculating the value of the Rx_SNR subfield as:

$$\text{Rx\_SNR} = 10log_{10}\left(\sum_{i=1}^{N_{rx}}\sum_{k=1}^{N_{sc}}S_{i,k}\right) - 10log_{10}\left(\sum_{i=1}^{N_{rx}}\sum_{k=1}^{N_{sc}}N_{i,k}\right)$$

wherein:

i denotes an index of a receiver chain, i=1, . . . , $N_{rx}$;

k denotes an index of occupied subcarrier in a frequency band or band segments in which the CSI estimation is performed, k=1, . . . , $N_{sc}$;

$N_{rx}$ denotes a number of sensing receivers;

$N_{sc}$ denotes a number of occupied subcarriers in the frequency band or band segments in which the CSI estimation is performed;

$S_{i,k}$ denotes a signal power for a $k^{th}$ occupied subcarrier at an $i^{th}$ receiver; and $N_{i,k}$ denotes a noise power for the $k^{th}$ occupied subcarrier at the $i^{th}$ receiver.

6. A method, comprising:

performing a sensing measurement; and generating a sensing measurement report which includes a receive (Rx) signal-to-noise ratio (Rx SNR) subfield indicating a Rx signal quality used in a channel state information (CSI) estimation, wherein the generating of the sensing measurement report comprises calculating a value of the Rx_SNR subfield reflecting $\text{Rx\_SNR}_i$ as an average of Rx signal-to-noise ratios measured in decibel (dB) for an $i^{th}$ receiver chain, with the $\text{Rx\_SNR}_i$ calculated as $\text{Rx\_SNR}_i=10/\log_{10}$ (Si/Ni), and wherein Si and Ni denote a signal power and a noise power, respectively, accumulated over all occupied subcarriers in an applicable bandwidth for CSI estimation.

7. The method of claim 6, wherein the calculating of the value of the Rx_SNR subfield comprises calculating the value of the Rx_SNR subfield as:

$$\text{Rx\_SNR}_i = 10log_{10}\sum_{k=1}^{N_{sc}}S_{i,k} - 10\log_{10}\sum_{k=1}^{N_{sc}}N_{i,k}$$

wherein:

i denotes an index of a receiver chain, i=1, . . . , $N_{rx}$;

k denotes an index of occupied subcarrier in a frequency band or band segments in which the CSI estimation is performed, k=1, . . . , $N_{sc}$;

$N_{rx}$ denotes a number of sensing receivers;

$N_{sc}$ denotes a number of occupied subcarriers in the frequency band or band segments in which the CSI estimation is performed;

$S_{i,k}$ denotes a signal power for a $k^{th}$ occupied subcarrier at an $i^{th}$ receiver; and $N_{i,k}$ denotes a noise power for the $k^{th}$ occupied subcarrier at the $i^{th}$ receiver.

8. The method of claim 6, wherein, responsive to the applicable bandwidth for CSI estimation being punctured, the $\text{Rx\_SNR}_i$ is averaged over one or more segments of a frequency band for which CSIs are estimated.

9. A method, comprising:

requesting a sensing measurement report from a sensing responder; and receiving a sensing measurement report from the sensing responder responsive to the requesting, the sensing measurement report including a receive (Rx) signal-to-noise ratio (Rx_SNR) subfield indicating a Rx signal quality used in a channel state information (CSI) estimation, wherein a value of the Rx SNR subfield is calculated as an average of Rx signal-to-noise ratios measured in dB by averaging overall receiver chains, wherein the value of the Rx SNR subfield is calculated as:

$$\text{Rx\_SNR} = \sum_{i=1}^{N_{rx}}\left(10log_{10}\sum_{k=1}^{N_{sc}}S_{i,k} - 10\log_{10}\sum_{k=1}^{N_{sc}}N_{i,k}\right)/N_{rx}$$

wherein:

i denotes an index of a receiver chain, i=1, . . . , $N_{rx}$;

k denotes an index of occupied subcarrier in a frequency band or band segments in which the CSI estimation is performed, k=1, . . . , $N_{sc}$;

$N_{rx}$ denotes a number of sensing receivers:

$N_{sc}$ denotes a number of occupied subcarriers in the frequency band or band segments in which the CSI estimation is performed;

$S_{i,k}$ denotes a signal power for a $k^{th}$ occupied subcarrier at an $i^{th}$ receiver; and $N_{i,k}$ denotes a noise power for the $k^{th}$ occupied subcarrier at the $i^{th}$ receiver.

10. The method of claim 9, wherein a value of the Rx_SNR subfield is calculated as an average of Rx signal-to-noise ratios measured in decibel (dB) on high-efficiency (HE) long training fields (HE-LTFs) or extremely-high-throughput (EHT) long training fields (EHT-LTFs).

11. The method of claim 9, wherein the Rx_SNR subfield comprises an 8-bit subfield, and wherein a value of the Rx_SNR subfield is mapped to an Rx SNR measured in decibel (dB) with a step size of 0.25 dB, 0.5 dB or a different size.

12. The method of claim 11, wherein the value of the Rx_SNR subfield is mapped to a measured value range of x+[−10, 53.75] in dBs, and wherein x denotes an offset in a number of quarter dBs.

* * * * *